United States Patent Office 3,512,721
Patented May 19, 1970

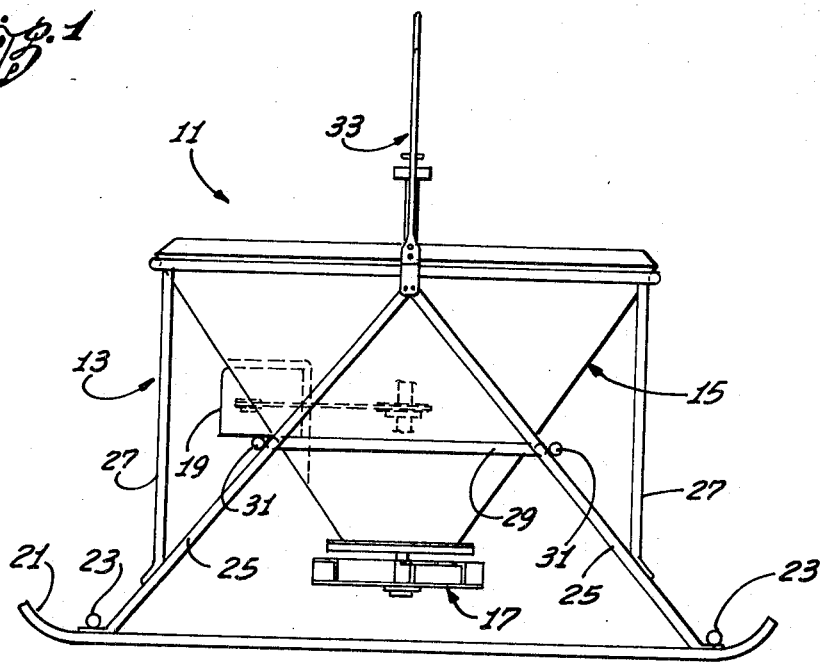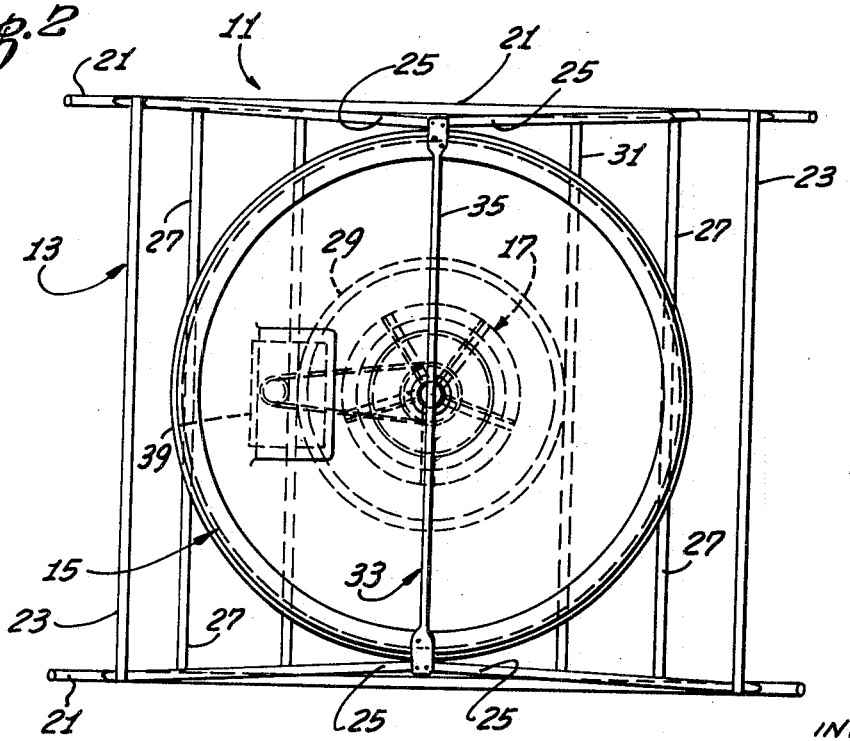

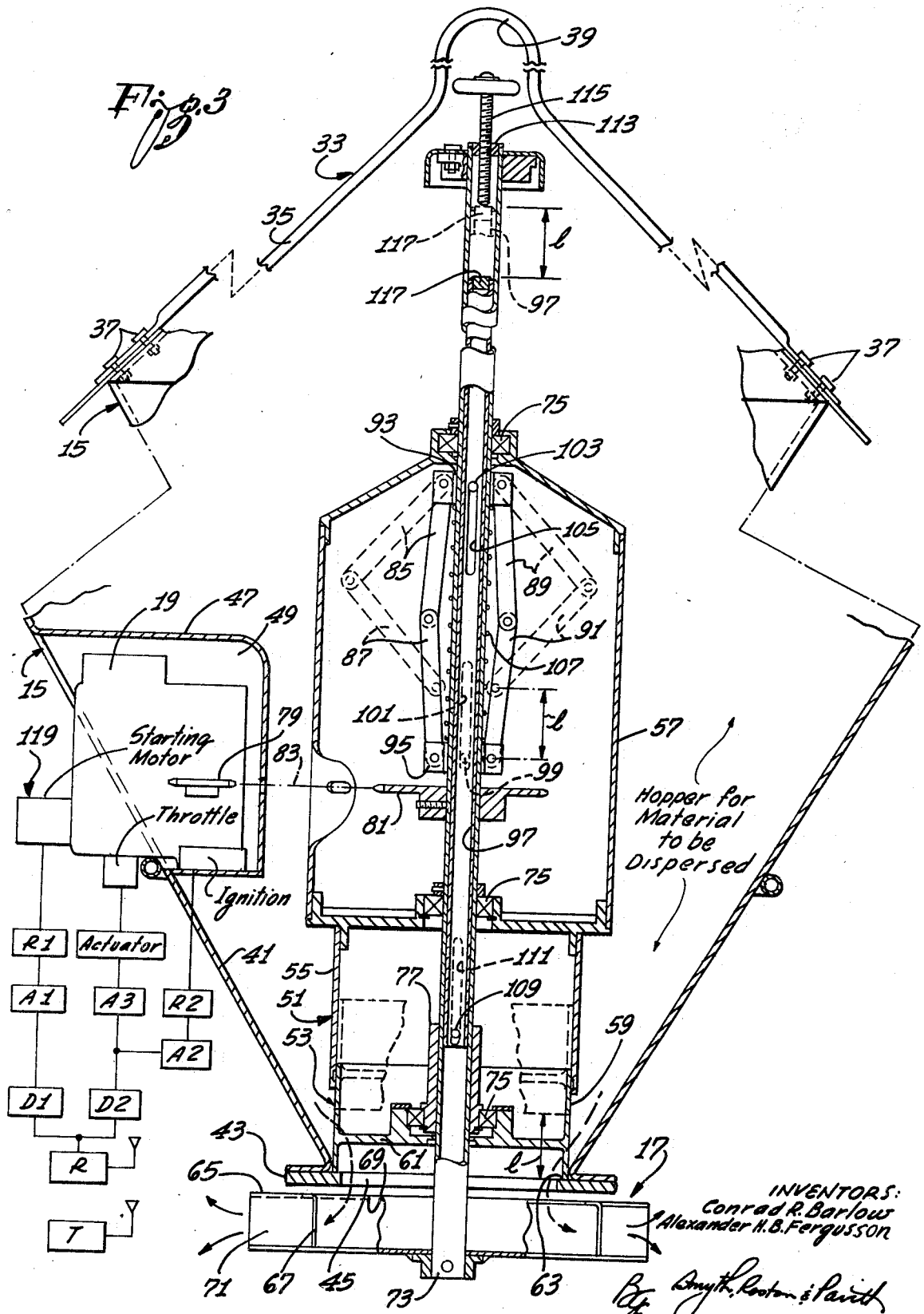

3,512,721
SPREADER FOR FLOWABLE MATERIAL
Conrad R. Barlow, Redondo Beach, and Alexander H. B. Fergusson, Rialto, Calif., assignors to Transland Aircraft, Inc., Harbor City, Calif., a corporation of California
Filed Jan. 29, 1968, Ser. No. 701,342
Int. Cl. A01c 17/00; B05b 17/02
U.S. Cl. 239—668          10 Claims

ABSTRACT OF THE DISCLOSURE

This disclosure describes a spreader for flowable material which includes a hopper for storing the flowable material and having an opening therein through which the flowable material can pass. An impeller receives the material from the opening in the hopper and distributes the material. A valve controls the flow of material to the impeller.

BACKGROUND OF THE INVENTION

Various dry flowable materials such as chemicals, fertilizers and seeds are often distributed over an area of land from the air. To accomplish this, a spreader is connected to an aircraft such as a helicopter. When in flight, the spreader distributes the material over the desired area.

A typical conventional spreader includes a hopper for storing the material, an impeller-type distributor offset laterally from the hopper and an auger to move the material from the hopper to the impeller. The impeller and auger are driven by a hydraulic motor and the aircraft must carry suitable hydraulic equipment to power the motor.

This conventional system is quite complex in that it uses an auger to convey the material laterally from the hopper to the impeller. Furthermore, the auger cannot be effectively used in planting various crops as rice because it cuts off the sprouts. The hydraulic motor is undesirable in that it requires the use of heavy and expensive hydraulic equipment on the aircraft. In addition several hydraulic connections between the aircraft and the spreader must be made. This increases the overall time required for connecting the spreader to the helicopter. More importantly, however, making of these connections endangers the workmen because they must be made while the helicopter hovers over the spreader.

SUMMARY OF THE INVENTION

The present invention eliminates all of the disadvantages noted above. One concept of this invention is to eliminate the auger used heretofore to convey the flowable material laterally of the hopper to a distributor. This reduces both the cost and the weight of the system. To this end the present invention may be embodied in a spreader which includes a hopper for storing the flowable material and having an opening or discharge port in the lower side thereof through which the flowable material tends to flow under the influence of gravity. The impeller is mounted directly beneath the discharge port in the hopper. The material flows by gravity from the hopper through the discharge port and against the impeller which spreads the material. With this arrangement, no auger is required.

The flow of the material through the discharge port in the hopper is controlled by a valve or a gate. The valve preferably includes a valve member which is movable to block the discharge port and for opening the port to allow the flow of material therethrough.

A feature of this invention is that the various power operated components of the spreader are driven by motor means mounted on the spreader and controlled by a radio transmitter and receiver system. Preferably, the motor is an internal combustion engine. The transmitter is preferably mounted on the aircraft and the receiver is mounted on the spreader. A primary advantage of using a radio controlled internal combustiion engine is that the heavy and expensive hydraulic equipment used heretofore is no longer required. Furthermore, the number of connections that must be made between the aircraft and the spreader is significantly reduced, thereby facilitating hookup of the spreader to the aircraft.

With the present invention, a single motor can operate both the impeller and the valve. Preferably, the motor drives the drive shaft for the impeller and centrifugal means which opens the valve. In a preferred form of the invention, the valve includes a valve member which is raised by the centrifugal means to expose the discharge port in the hopper. The amount that the valve member opens can be conveniently controlled by an adjustable stop.

The invention, both as to its organization and method of operation together with further features and advantages thereof may be best understood by reference to the following description taken in connection with the accompanying illustrative drawing.

BRIEF DESCRIPTION OF THE DRAWINGS

FIG. 1 is a side elevational view of one form of spreader constructed in accordance with the teachings of this invention.

FIG. 2 is a top plan view of the spreader.

FIG. 3 is a sectional view through the spreader.

DESCRIPTION OF THE PREFERRED EMBODIMENTS

Referring to the drawings and in particular to FIGS 1 and 2 thereof, reference numeral 11 designates a spreader constructed in accordance with the teachings of this invention. Generally the spreader includes a frame 13, a hopper 15 mounted on the frame, an impeller assembly 17 mounted on the hopper and a motor 19. Although the frame 13 may be of any suitable shape that will adequately support the hopper 15, in the embodiment illustrated it includes a pair of spaced parallel runners 21 joined by several cross members 23. The hopper 15 is supported, in part, by four struts 25 which extend upwardly from the runners 21 and are suitably joined, as by welding, to upper portions of the hopper. Four additional struts 27 extend upwardly from the struts 25 and are suitably secured to upper portions of the hopper 15. A ring 29 surrounds the hopper 15 and is suitably connected to a pair of cross bars 31 which extend between the struts 25 to further support the hopper.

The spreader 11 is adapted to be carried by an aircraft such as a helicopter and to this end a suitable hanger assembly 33 is provided. The hanger assembly 33 includes a strong rod 35 secured to the hopper 15 by bolts 37 (FIG. 3) and having a downwardly opening U-portion 39 formed centrally thereof.

With reference to FIG. 3, the hopper 15 contains the material which is to be spread and such material may be any flowable material. The spreader 11 is particularly adapted for spreading dry material. The hopper 15 includes a generally frustoconical shell 41 which tapers as it extends downwardly. The shell 41 has an open bottom and a ring 43 having an opening or discharge port 45 therein is suitably secured to the lower end of the shell 41 adjacent the open bottom thereof. The shell 41 has an inwardly formed portion 47 which defines a compartment 49 for the motor 19. The hopper 15 may be filled with the material which is to be dispersed.

A valve 51 controls the flow of material through the opening 45. The valve 51 includes a movable valve member 53 and a tubular valve guide 55. The valve guide 55 is suitably mounted on a housing 57 which is secured in any convenient manner to the shell 41.

The valve member 53 includes a sleeve 59 telescoped within the valve guide 55 and an end wall 61. When the valve member 53 is in the lowermost or closed position shown in full lines in FIG. 3, the lower annular end of the sleeve 59 rests on a valve seat 63 which is defined by the ring 43 to close the discharge port 45. The valve member 53 is movable upwardly to space the lower end of the sleeve 59 from the valve seat 63 to thereby open the discharge port 45 and allow the material to flow therethrough.

The impeller assembly 17 includes a housing 65 and an impeller which includes vanes 67 mounted for rotation within the housing. The housing 65 has an opening or inlet 69 immediately beneath the discharge port 45 and an outlet 71 in the form of a peripheral opening through which the material is propelled by the rotating vanes 67.

The vanes 67 are suitably mounted for rotation on a vertically extending hollow drive shaft 73 which extends upwardly through the discharge port 45 and centrally through a major portion of the hopper 15. The drive shaft 73 is rotatably mounted by several axially spaced bearings 75. Two of the bearings 75 are mounted on the housing 57 and the lowermost bearing 75 is mounted between the end wall 61 of the valve member 53 and a sleeve 77 which is slidable axially on the drive shaft 73. Thus, the axial sliding movement of the valve member 53 is guided by the valve guide 55 and by the drive shaft 73.

The drive shaft 73 is driven by the motor 19. In the embodiment illustrated, the driving connection between the motor 19 and the drive shaft 73 includes a driving sprocket 79, a driven sprocket 81 mounted on the drive shaft 73 and an endless chain 83 extending between the sprockets.

The valve 51 is operated by centrifugal means in the form of four links 85, 87, 89 and 91. The links 85 and 89 are pivotally mounted at their upper ends to a collar 93 which is suitably fixed to the drive shaft 73 for rotation therewith. Similarly, the links 87 and 91 are pivotally connected to a collar 95 which is loosely mounted on the drive shaft 73 to permit relative axial movement therebetween. The adjacent ends of the links 85 and 87 are pivotally interconnected as are the adjacent ends of the links 89 and 91.

An operating shaft 97 is mounted within the drive shaft 73 for limited axial movement relative thereto. The operating shaft 97 drivingly interconnects the links 85, 87, 89 and 91 and the valve member 53 to move the latter axially.

The collar 95 is suitably fixedly connected to the operating shaft 97 as by a pin 99 which extends through an axial slot 101 in the drive shaft 73. The upper collar 93 is fixed to the drive shaft 73 and a pin 103 extends from the collar 93 through the drive shaft 73 and into an axially extending slot 105 in the operating shaft 97. With this arrangement, it can be seen that the links can be moved to the position shown in dashed lines in FIG. 3. Normally, however, when the motor 19 is not operating, a spring 107 urges the links to the position shown in full lines in FIG. 3. The lower end of the operating shift 97 is connected to the sleeve 77 by a pin 109 which rides in an axially extending slot 111 in the drive shaft 73.

To operate this portion of the device, the motor 19 is started to rotate the drive shaft 73 and the vanes 67 of the impeller assembly 17. Because the collar 93 is fixed to the drive shaft 73, rotation of the latter also rotates the links 85, 87, 89 and 91. The operating shaft 97 also rotates because the pins 99 and 103 drivingly interconnect the shaft 97 to the collars 95 and 93 for rotational movement together.

As the rotational speeds of the drive shaft 73 increases, the centrifugal force acting on the links eventually becomes sufficient to overcome the biasing force of the spring 107 and the mass of the several elements affixed to the links and the links move radially outwardly toward the position shown in dashed lines in FIG. 3. As the links move outwardly, the collar 95 and the pin 99 move axially upwardly along the drive shaft 73. As the pin 99 is fixed to the operating shaft 97, the axial movement of the pin causes axial upward movement of the operating shaft. As the operating shaft 97 is pulled upwardly, the valve member 53 is pulled upwardly a corresponding amount by virtue of the axial driving connection therebetween. As shown in the lower portion of FIG. 3, such driving connection includes the pin 109, the sleeve 77, and the bearings 75. When the lower end of the sleeve 59 of the valve member 53 moves off of the valve seat 63, the material in the hopper 15 flows by gravity through the discharge port 45 and into the impeller assembly 17. The lowermost bearing 75 allows the drive shaft 73 and the sleeve 77 to rotate without imparting rotational movement to the valve member 53.

The amount that the valve member 53 moves upwardly controls the effective size of the opening of the hopper to thereby control the rate of flow of the material through the discharge port 45. According to the present invention, the amount that the valve 51 opens can be adjusted, and according to the specific embodiment illustrated, this is accomplished by controling the amount of axial upward movement of the operating shaft 97. The upper end of the drive shaft 73 has a nut 113 welded thereto and a bolt 115 mounted within the nut. The upper end of the operating shaft 97 has a plug 117 fixed therein. When the operating shaft is moved upwardly from the position shown in full lines to the position shown in phantom in FIG. 3, the plug 117 engages the lower end of the bolt 115. Thus, the bolt 115 forms a stop for limiting the upward travel of the operating shaft 97 and hence the upward axial movement of the valve member 53. Of course, the position of the lower end of the bolt 115 is easily adjusted by turning of the bolt to thereby provide an adjustable stop for the operating shaft 97. The distance through which the valve member 53 moves is represented in FIG. 3 by a dimension designated 1.

The spreader 11 is particularly adapted to be suspended from a rotary wing aircraft. A hook or other suitable means suspended from the aircraft engages the U-portion 39 to permit carrying of the spreader 11 aloft. As the motor 19, when operating, rotates the vanes 67 and opens the valve 51, the motor 19 should not be started until the aircraft is over the area on which the material is to be spread. A feature of this invention is the elimination of the complex hydraulic equipment and the numerous hydraulic connections between the spreader 11 and the aircraft. According to the present invention, a radio transmitter and receiver system 119 is provided for the remote control of the motor 19. The system 119 includes a transmitter T located within the aircraft to permit operation thereof by the pilot. A receiver R is suitably mounted on the spreader 11. A demodulator D1 is electrically connected to the receiver for providing a modulator frequency suitable for making a circuit to a battery operated starting motor which can be energized to start the motor 19. As shown, the starting motor circuit also includes an amplifier A1 and a relay R1 which operates to complete a circuit from the batteries to the starting motor.

A second demodulator D2 provides a second modulator frequency which is suitable to complete an ignition circuit for the motor 19 and for controlling the position of the throttle. The ignition circuit also includes an amplifier A2 and a relay R2 with the relay R2 being closed in response to a signal from the amplifier A2 to complete the ignition circuit for the motor 19.

An amplifier A3 is connected to the demodulator D2 and provides signal to an actuator which may be an appropriate conventional electromechanical device for controlling throttle position. The demodulator signal from the demodulator D2 will have a variable characteristic such as amplitude which controls the throttle position.

Utilizing the radio transmitter and receiver system 119, there is no need for any connections between the motor 19 and the aircraft for the purpose of controlling the motor 19. The pilot uses the transmitter T to send out appropriate signals to accomplish starting of the motor 19, making of the ignition circuit of the motor 19 and controlling the position of the throttle for the motor 19.

Although exemplary embodiments of the invention have been shown and described, many changes, modifications, and substitutions may be made by one having ordinary skill in the art without necessarily departing from the spirit and scope of this invention.

What is claimed is:

1. A distribution apparatus connectible to an aircraft for distributing flowable material, comprising:
   a hopper for storing the flowable material, said hopper having an opening in the lower side thereof through which the flowable material can flow;
   valve means adjacent said opening for closing said opening to prevent flow of the flowable material therethrough and for opening said opening to allow flow of the flowable material therethrough;
   spreader means adjacent said opening for receiving and dispersing the flowable material flowing through said opening, said spreader means including a movable member for dispersing the flowable material;
   a motor drivingly connected to said movable member to move said movable member and operate said spreader means;
   a centifigural member driven by said motor for providing centrifugal force;
   means responsive to the centrifugal force for opening said valve means; and
   means for isolating the centrifugal member from the flowable material in the hopper.

2. An apparatus as defined in claim 1 wherein said centrifugal member is substantially within the hopper and said mentioned means includes a housing at least substantially within said hopper.

3. An apparatus as defined in claim 1 including means for at least partially enclosing said centrifugal member.

4. In a spreader for connection to an aircraft for distributing flowable material, the combination of:
   a hopper for storing the flowable material, said hopper having an opening in the lower side thereof through which the flowable material tends to flow under the influence of gravity;
   an impeller assembly mounted beneath said opening, said impeller assembly including a rotatable impeller;
   a rotatable drive shaft extending upwardly through said opening in said hopper, said impeller being mounted on said drive shaft and rotatable therewith;
   means for rotating said drive shaft;
   a valve member movable between a closed position in which flow of the flowable material through said opening is prevented and a raised open position in which the flowable material can flow through said opening under the influence of gravity and toward said impeller;
   a centrifugal drive member in said hopper drivingly connected to said drive shaft for rotation therewith, said drive member being movable outwardly of said drive shaft in response to rotation thereof;
   means for drivingly connecting said valve member to said centrifugal member for raising said valve member to said raised open position in response to movement of said centrifugal member outwardly; and
   housing means at least partially within said hopper for substantial isolating said centrifugal drive member from the flowable material whereby the centrifugal member can move outwardly of said drive shaft without significant interference from the flowable material.

5. A combination as set forth in claim 4 wherein said means for rotating said drive shaft includes an engine, said combination including electrical control means for remotely controlling said engine.

6. A combination as defined in claim 4 wherein said centrifugal drive member is mounted on said drive shaft and said housing surrounds a portion of said drive shaft, said combination including means including said valve member for surrounding substantially the full length of said drive shaft between said housing and said opening.

7. A combination as defined in claim 5 wherein said electrical control means includes means accessible to the pilot of the aircraft while the aircraft is being flown for providing a control signal and means adjacent said hopper and remote from the pilot of the aircraft when the aircraft is flying and responsive to said control signal for operating said means for rotating said drive shaft to cause the centrifugal drive member to move said valve member to said open position.

8. A combination as set forth in claim 4 wherein said drive shaft is hollow and said means for drivingly connecting includes an operating shaft slidably mounted in said drive shaft, the combination also including stop means engageable with said operating shaft for limiting the amount that said valve member can be raised to thereby control the flow rate through said opening, said stop means including an adjustable member accessible from outside of said housing for adjusting the amount which said valve member can be raised.

9. In a spreader for connection to an aircraft for distributing flowable material, the combination of:
   a hopper for storing the flowable material, said hopper having an opening therein through which the flowable material can flow;
   a movable gate adjacent said opening for closing said opening to prevent the flow of material therethrough and for opening said opening to allow flow of the flowable material therethrough;
   spreader means on the discharge side of said opening for receiving and spreading the flowable material flowing through said opening, said spreader means including a movable member for spreading the flowable material;
   means for driving said movable member to spread the flowable material;
   a shaft mounted for rotation within said hopper;
   motor means for rotating said shaft;
   a centrifugal member in said hopper pivotally connected to said shaft and rotatable therewith whereby upon rotation of said shaft the centrifugal member pivots outwardly relative to said shaft under the influence of centrifugal force;
   means for drivingly interconnecting said gate and said centrifugal member so that said gate opens said opening in response to outward pivotal movement of said centrifugal member; and
   means within said hopper for at least partially surrounding said centrifugal member so that the flowable member in the hopper cannot significantly hinder the pivotal movement of said centrifugal member.

10. A spreader for connection to an aircraft for distributing flowable material, the combination of:
    a hopper for storing the flowable material, said hopper having an opening therein through which the flowable material can flow;
    valve means adjacent said opening for closing said opening to prevent flow of the flowable material therethrough and for opening said opening to allow flow of the flowable material therethrough;

spreader means adjacent said opening for receiving and spreading the flowable material flowing through said opening, said spreader means including a movable member for spreading the flowable material;

motor means for driving said movable member;

means for drivingly connecting said motor means and said valve means for permitting said motor means to open said valve means;

transmitter means actuatable by the pilot of the aircraft while the aircraft is flying and remote from the hopper for producing a radio control signal; and means remote from said transmitter means and adjacent said motor means and responsive to said control signal for operating said motor means to cause said motor means to open said valve means.

References Cited

UNITED STATES PATENTS

| | | | |
|---|---|---|---|
| 1,550,567 | 8/1925 | Oliver | 222—500 X |
| 2,941,753 | 6/1960 | Ripper | 244—77 |
| 3,216,617 | 11/1965 | Blomgren et al. | 222—333 X |

STANLEY H. TOLLBERG, Primary Examiner

H. S. LANE, Assistant Examiner

U.S. Cl. X.R.

222—333, 500; 239—171, 684